US012340780B2

(12) United States Patent
Freer

(10) Patent No.: US 12,340,780 B2
(45) Date of Patent: Jun. 24, 2025

(54) MUFFLER FOR PERCUSSION INSTRUMENT

(71) Applicant: Thomas C. Freer, Cleveland Heights, OH (US)

(72) Inventor: Thomas C. Freer, Cleveland Heights, OH (US)

(73) Assignee: Thomas C. Freer, Cleveland Heights, OH (US)

( * ) Notice: Subject to any disclaimer, the term of this patent is extended or adjusted under 35 U.S.C. 154(b) by 216 days.

(21) Appl. No.: 18/111,236

(22) Filed: Feb. 17, 2023

(65) Prior Publication Data

US 2024/0282282 A1 Aug. 22, 2024

(51) Int. Cl.
*G10D 13/14* (2020.01)

(52) U.S. Cl.
CPC .................................... *G10D 13/14* (2020.02)

(58) Field of Classification Search
CPC ..................................................... G10D 13/14
See application file for complete search history.

(56) References Cited

U.S. PATENT DOCUMENTS

| | | | | |
|---|---|---|---|---|
| 4,338,850 A * | 7/1982 | Payson | G10D 13/14 984/151 |
| 8,541,675 B2 * | 9/2013 | Strickland | G10D 13/02 84/411 M |
| 9,135,899 B2 * | 9/2015 | Jones | G10D 13/14 |
| 9,711,116 B2 * | 7/2017 | Strickland | G10D 13/02 |
| 11,651,754 B2 * | 5/2023 | Strickland | G10D 13/14 84/411 M |
| 11,810,537 B1 * | 11/2023 | Maniatty | G10D 13/14 |
| 2019/0019479 A1 * | 1/2019 | Strickland | F16B 2/245 |
| 2022/0148544 A1 * | 5/2022 | Gale | G10D 13/14 |
| 2024/0282282 A1 * | 8/2024 | Freer | G10D 13/14 |

OTHER PUBLICATIONS

Author Unknown, Majestic International (available at https://majesticpercussion.com/international/products/accessories/) at least a version of the product shown in the Product Accessories is believed to have been publicly available prior to Jul. 22, 2022 (6 pages).

* cited by examiner

*Primary Examiner* — Robert W Horn

(74) *Attorney, Agent, or Firm* — Calfee, Halter & Griswald LLP

(57) ABSTRACT

A muffler for a percussion instrument includes a main body configured to engage a drumhead of the percussion instrument to dampen sound of the percussion instrument. The main body includes a middle portion, a first side portion, a second side portion, a first hinge portion, and a second hinge portion. The first hinge portion is disposed between the first side portion and the middle portion and allows the first side portion to be folded over the middle portion. The second hinge portion is disposed between the second side portion and the middle portion and allows the second side portion to be folded over the middle portion.

19 Claims, 14 Drawing Sheets

MUFFLER FOR PERCUSSION INSTRUMENT

TECHNICAL FIELD

The present invention relates generally to mufflers for a percussion instrument, and more particularly, to mufflers for a snare drum.

BACKGROUND

Drum mufflers (or mutes) are used to dampen (or reduce) the sound of a drum. Drum mufflers are typically positioned inside of a drum shell and engage one or more drumheads from underneath. In these instances, pressure and adjustments can be made to these drum mufflers by engaging a simple tension knob on the outside of the shell. In other instances, drum mufflers have been attached to an exterior of a drum such that the drum muffler engages an exterior portion of a drumhead.

SUMMARY

An exemplary embodiment of a muffler for a percussion instrument includes a main body configured to engage a drumhead of the percussion instrument to dampen sound of the percussion instrument. The main body includes a middle portion, a first side portion, a second side portion, a first hinge portion, and a second hinge portion. The first hinge portion is disposed between the first side portion and the middle portion and allows the first side portion to be folded over the middle portion. The second hinge portion is disposed between the second side portion and the middle portion and allows the second side portion to be folded over the middle portion.

An exemplary embodiment of a muffler system for a percussion instrument includes a muffler, a mesh member, and a clip. The muffler has a main body and a tail portion extending from the main body. The tail portion has one or more connection openings. The main body includes a middle portion, a first side portion, a second side portion, a first hinge portion, and a second hinge portion. The first hinge portion is disposed between the first side portion and the middle portion and allows the first side portion to be folded over the middle portion. The second hinge portion is disposed between the second side portion and the middle portion and allows the second side portion to be folded over the middle portion. The mesh member is configured to be attached to the muffler. The clip is configured to attach the muffler to the percussion instrument. The clip has one or more connection openings for alignment with the one or more connection openings of the tail portion of the muffler such that a fastener can be inserted into a connection opening of the one or more connection openings of the clip and an aligned connection opening of the one or more connection openings of the tail portion of the muffler to secure the muffler to the clip.

An exemplary method for forming one or more hinge portions on a muffler for a percussion instrument includes indicating a location on the muffler for a hinge portion. The method further includes punching one or more holes at the indicated location such that a first portion of the muffler is disposed on one side of the one or more holes and a second portion of the muffler is disposed on another side of the one or more holes. The one or more holes allow the first portion of the muffler to be folded over the second portion of the muffler.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

As described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members, or elements. Further, as described herein, the terms "substantially" and "about" are defined as at least close to (and includes) a given value or state (preferably within 10% of, more preferably within 1% of, and most preferably within 0.1% of).

The mufflers described herein enables a percussionist to easily adjust the amount of dampening provided to a percussion instrument by a muffler that is attached thereto. For example, the mufflers can include one or more hinge portions that allow for the muffler to be moved between a normal position and one or more folded positions, where the mufflers are capable of maintaining the folded positions as a percussionist uses the percussion instrument. In some instances, the mufflers are configured to be connected to the percussion instruments by a connector that allows a position of the muffler relative to a drumhead of the percussion instrument to be adjusted. In some instances, a mesh member can be attached to the muffler to provide additional dampening to the percussion instrument. While the various examples described herein refer to mufflers, it should be understood that the term muffler also includes mutes, overtone controllers, overtone modifiers, overtone limiters, overtone modulators, resonance controllers, resonance modifiers, resonance limiters, resonance modulators, frequency controllers, frequency modifiers, frequency limiters, frequency modulators, or any other suitable device that is capable adjusting a sound of a percussion instrument.

Figure 1:
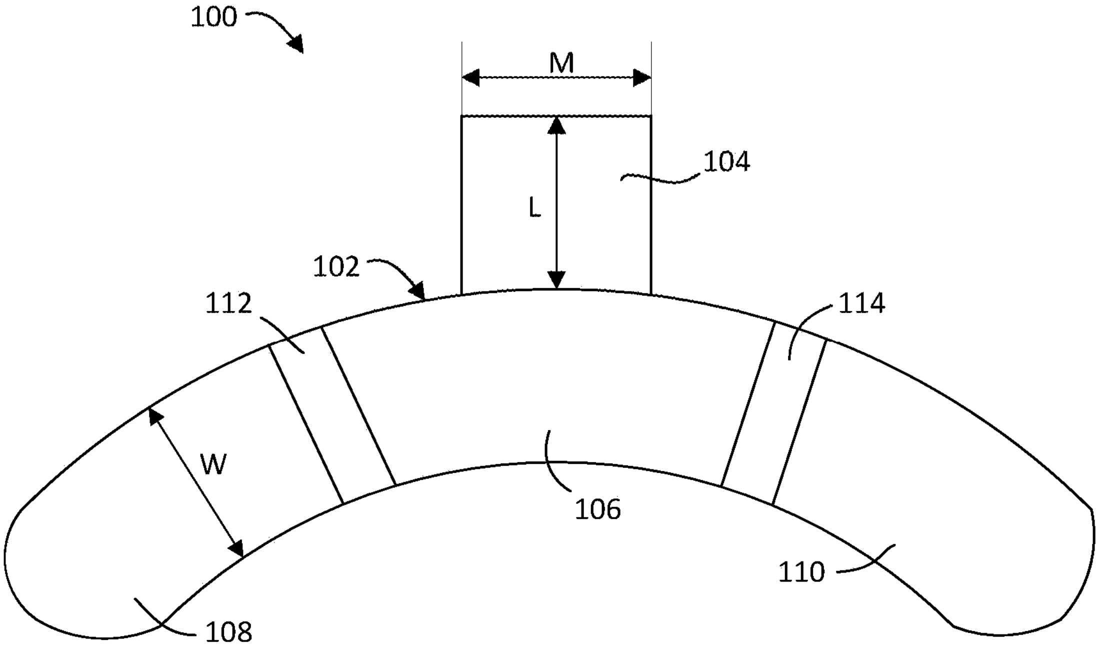
FIG. 1 is a schematic view of an exemplary embodiment of a muffler for a percussion instrument.

FIG. 1 illustrates an exemplary embodiment of a muffler 100 for a percussion instrument (e.g., the percussion instrument 101 shown in FIGS. 2-3), where the muffler 100 includes a main body 102 and an optional tail portion 104 connected to and extending from the main body 102. The tail portion 104 is configured to be engaged by a connector 116 (FIGS. 2-3) to connect the muffler 100 to the percussion instrument 101 such that the main body 102 engages an exterior of a drumhead 118 of the percussion instrument 101. In some instances, the tail portion 104 also engages an exterior of the drumhead 118. In embodiments in which the muffler 100 does not include the tail portion 104, the muffler 100 can be attached to a percussion instrument 101 by any other suitable means that allows the main body 102 to engage the drumhead 118. The percussion instrument 101 can be, for example, a snare drum, field drum, bass drum, tom drum, drum set, timpani drum, or any other suitable percussion instrument.

Figure 2:
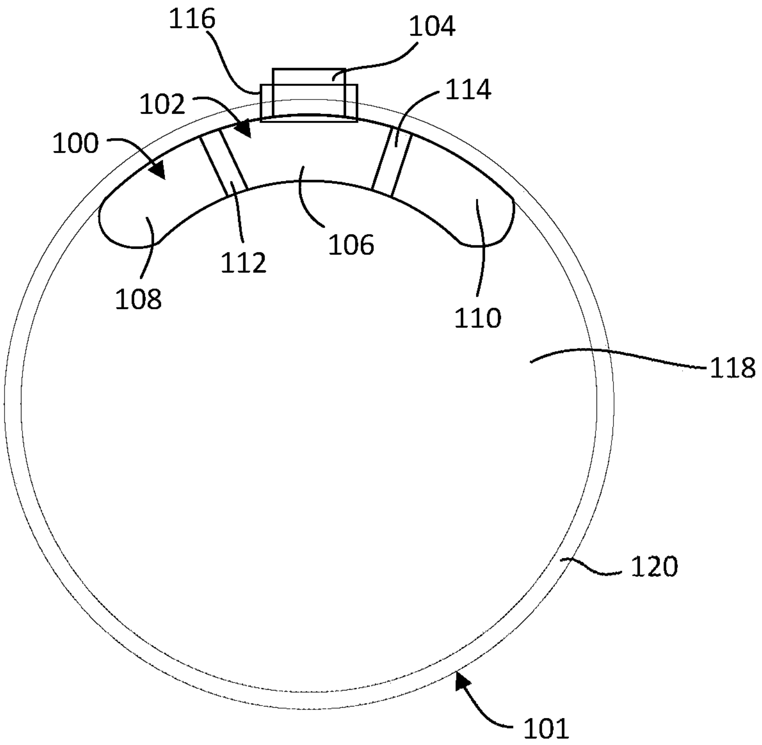
FIG. 2 is a schematic view of a percussion instrument with the muffler of FIG. 1 attached thereto, where the muffler is in a first position relative to the percussion instrument.
Figure 3:
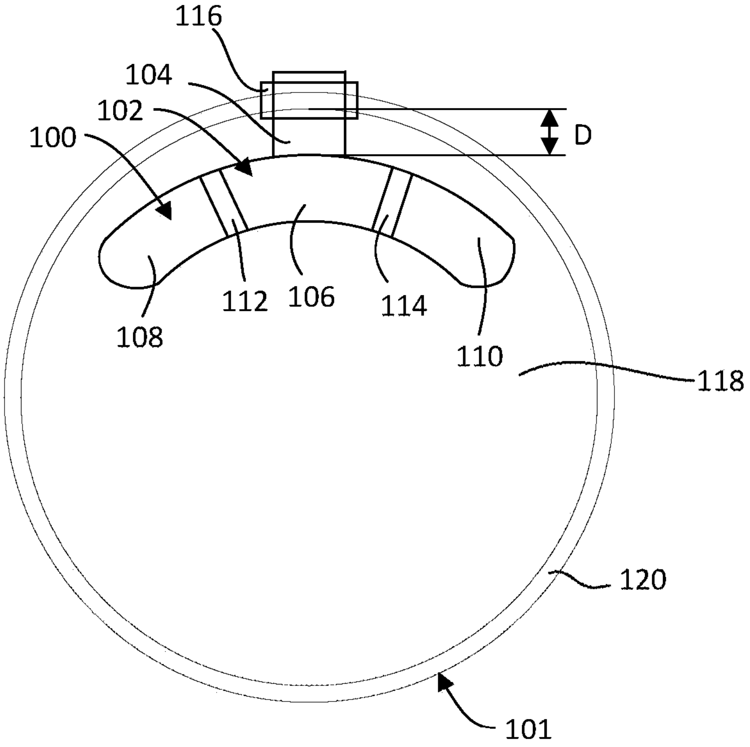
FIG. 3 is a schematic view of the percussion instrument with the muffler of FIG. 1 attached thereto, where the muffler is in a second position relative to the percussion instrument.

Referring to FIGS. 2 and 3, in the illustrated embodiment, the tail portion 104 of the muffler 100 is attached to a hoop 120 of the percussion instrument 101 by the connector 116. The connector 116 can take any suitable form, such as, for example, a clip, a clamp (plastic or metal), or any suitable form for a connector 116 described in the present application. The tail portion 104 can be configured to be adjustably connected to the connector 116 such that the position of the muffler 100 relative to the hoop 120 of the percussion instrument 101 is adjustable, such as, for example, by the connection between the connector 116 and the tail portion 104 shown in FIG. 4. Referring to FIG. 1, the tail portion can extend a length L from the main body 102, where the length L is between 3 mm about and about 15 mm. The tail portion 104 can have a width M of between about 15 mm and about 25 mm. In the illustrated embodiment, the tail portion 104 is shown extending from the middle portion 106 of the main body 102, but it should be understood that the tail portion 104 can extend from any portion of the main body 102.

Figure 4:
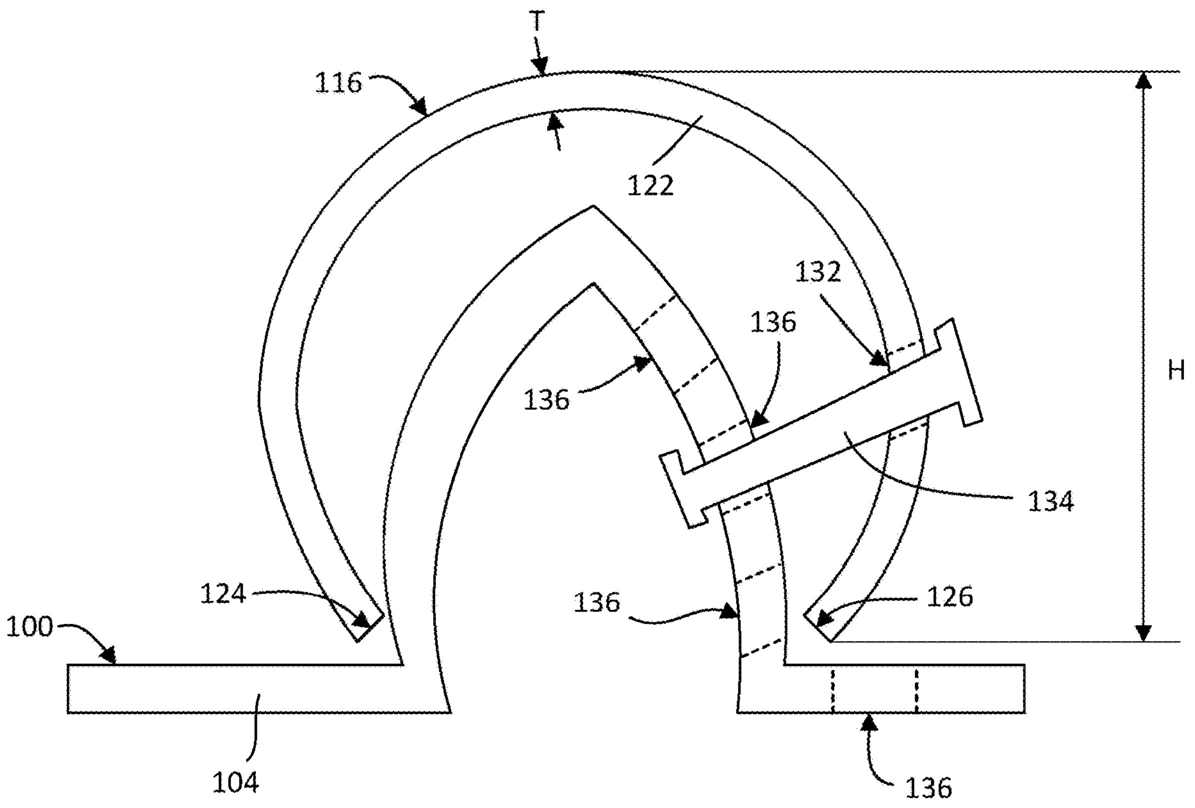
FIG. 4 is a schematic view of an exemplary embodiment of a connector for connecting a muffler to a percussion instrument.

Referring to FIG. 4, in certain embodiments, the connector 116 is a clip that includes a main body 122 having a first edge 124 and a second edge 126 that define an opening 128. The opening 128 is sized such that the hoop 120 of the percussion instrument 101 can extend into the opening 128 while the first and second edges 124, 126 provide a force to the hoop 120 that allows for the connector 116 to be secured to the hoop 120. The connector 116 can be configured to attach to any style hoop, such as, for example, a wood hoop, a metal hoop, a thick hoop, a thin hoop, or any other style hoop. The connection between the connector 116 and the hoop 120 allow for the connector 116 to be attached to the hoop 120 such that there is no unnecessary pressure around the hoop 120 and no downward pressure on the drumhead 118, which could change the pitch of the percussion instrument. The main body 122 of the connector can have a thickness T of between about 1 mm and about 2 mm. The main body 122 can have a height H of between about 15 mm and about 25 mm. The main body 122 of the connector 116 can be made of, for example, a plastic material, a metal material, a wooden material, a magnetized material, or any other suitable material.

The main body 122 can include a connection opening 132 for receiving a fastener 134 to connect the connector 116 to the tail portion 104 of the muffler 100. For example, the tail portion 104 can extend into the opening 128 such that the tail portion 104 is positioned between the hoop 120 of the percussion instrument 101 and the main body 122 of the connector 116, and the tail portion 104 can have a plurality of connection openings 136 for aligning with the connection opening 132 of the connector 116 such that the fastener 134 can extend through the connection opening 132 of the connector 116 and one of the connection openings 136 of the tail portion 104 to connect the tail portion 104 to the connector 116. Aligning a different one of the connection openings 136 of the tail portion 104 with the connection opening 132 of the connector and inserting the fastener 134 into the aligned connection openings allows the tail portion 104 and, consequently, the muffler 100 to be adjusted to different positions relative to the hoop 120 of the percussion instrument 101 (as shown in FIGS. 2 and 3).

The fastener 134 can be, for example, a rivet, a screw, an adhesive, or any other suitable type of fastener. While the fastener 134 is shown as being a separate component relative to the connector 116 and the tail portion 104 of the muffler 100, it should be understood that the fastener could be a component of one of the connector 116 and the tail portion 104 and configured to be inserted into a connection opening of the other of the connector 116 and the tail portion 104. While the connector 116 is shown as having a single connection opening 132, it should be understood that the connector 116 can have a plurality of connection openings positioned along its main body 122, or the connector 116 may not have any connection openings if the fastener 134 is a component of the connector 116 that is configured to be placed into a connection opening 136 of the tail portion 104. While the tail portion 104 is shown as having a plurality of connection openings 136, it should be understood that the tail portion 104 can have only a single connection opening, or the tail portion 104 may not have any connection openings if the fastener 134 is a component of the tail portion 104 that is configured to be placed into one or more connection openings 132 of the connector 116.

While the connector 116 shown in FIG. 4 is described as being used with the muffler 100, it should be understood that the connector 116 can be used with any suitable type of muffler that includes one or more connection openings that are capable of aligning with the connection opening(s) 132 of the connector 116.

Referring again to FIGS. 2-3, the adjustability of the tail portion 104 allows the main body 102 of the muffler 100 to be positioned at various positions relative to the hoop 120 and, consequently, the drum shell (not shown) of the percussion instrument. The muffler 100 will provide less dampening to the percussion instrument 101 when the main body 102 is proximate the hoop 120 (as shown in FIG. 2), and the muffler 101 will provide more dampening to the percussion instrument 101 as the main body 102 is moved away from the hoop 120 (as shown in FIG. 3). When the muffler 100 is in an extended position such that the main body 102 is a distance away from the hoop 120, the tail portion 104 may also engage the drumhead 118 to provide dampening to the percussion instrument 101.

Referring to FIGS. 1-3 and 4-8, the main body 102 can include a middle portion 106, a first side portion 108, and a second side portion 110. The main body 102 can further include a first hinge portion 112 and a second hinge portion 114, where the first hinge portion 112 is positioned between the middle portion 106 and the first side portion 108, and where the second hinge portion 114 is positioned between the middle portion 106 and the second side portion 110. The main body 102 and/or the tail portion 104 can be made, for example, leather, synthetic leather, suede, synthetic suede, wool felt, canvas or natural cloth materials (woven, pressed, etc.), or any other suitable material, and any combination thereof. In certain embodiments, the main body 102 and the tail portion 104 are made from a single piece of material.

The first hinge portion 112 allows the first side portion 108 to be folded over the middle portion 106, and the second hinge portion 114 allows the second side portion 110 to be folded over the middle portion 106. This is advantageous because it allows the muffler 100 to be easily adjusted to provide a desired amount of dampening to the percussion instrument 101. That is, the muffler can be adjusted between an original position in which the side portions 108, 110 maintain a normal position relative to the middle portion 106, a partially folded position in which only one of the side portions 108, 110 is folded over the middle portion 106, and a fully folded position in which both side portions 108, 110 are folded over the middle portion.

Figure 5:
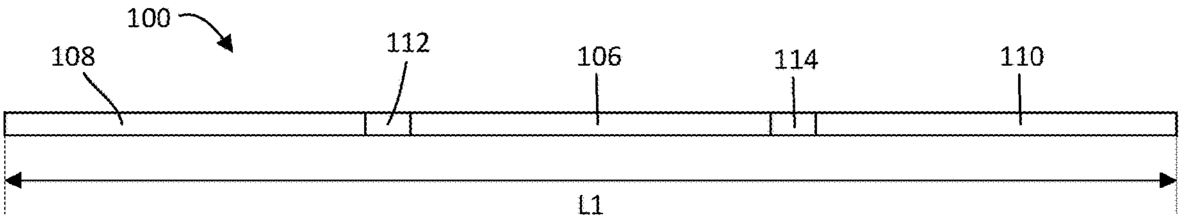
FIG. 5 is an elevation view of the muffler of FIG. 1, where the muffler is in an original position.
Figure 6:
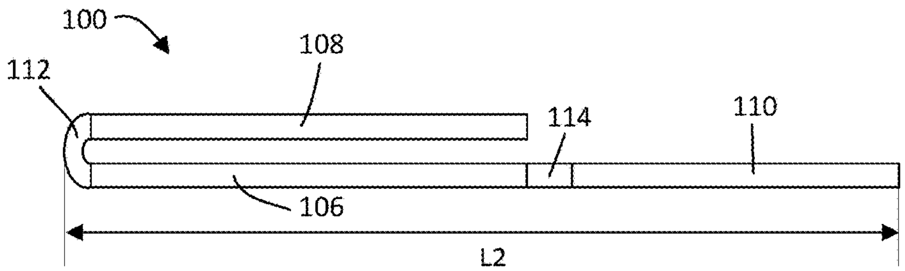
FIG. 6 is an elevation view of the muffler of FIG. 1, where the muffler is in a first folded position.
Figure 7:
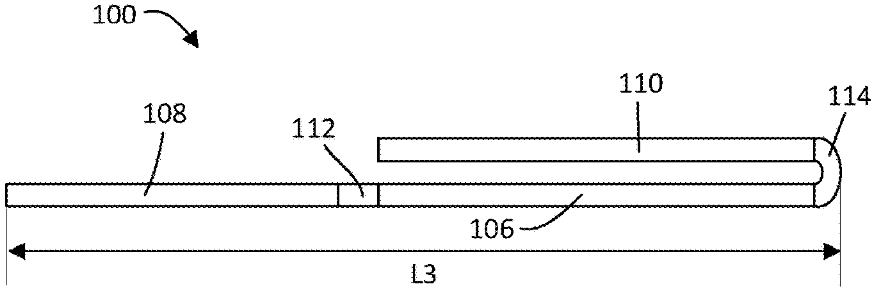
FIG. 7 is an elevation view of the muffler of FIG. 1, where the muffler is in a second folded position.
Figure 8:
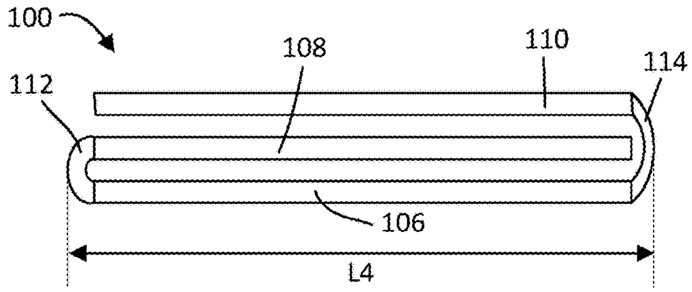
FIG. 8 is an elevation view of the muffler of FIG. 1, where the muffler is in a third folded position.
Figure 9:
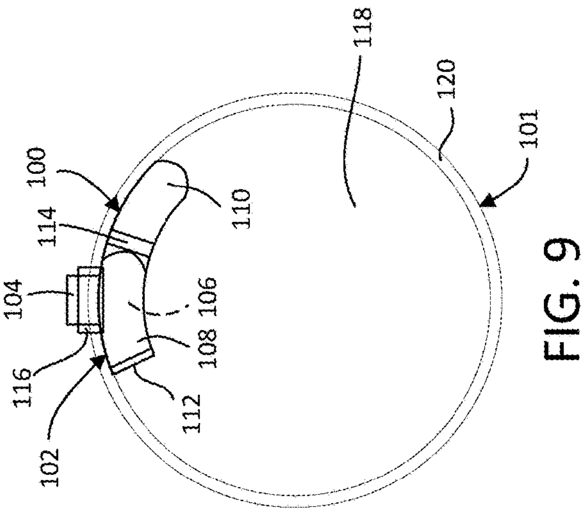
FIG. 9 is a schematic view of a percussion instrument with the muffler of FIG. 1 attached thereto, where the muffler is in the first folded position shown in FIG. 6.
Figure 10:
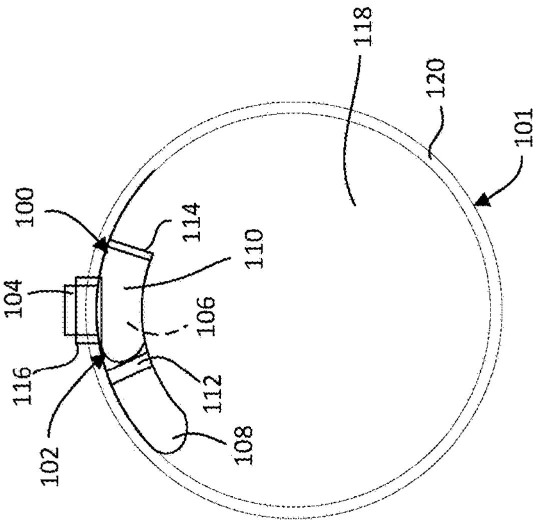
FIG. 10 is a schematic view of a percussion instrument with the muffler of FIG. 1 attached thereto, where the muffler is in the second folded position shown in FIG. 7.
Figure 11:
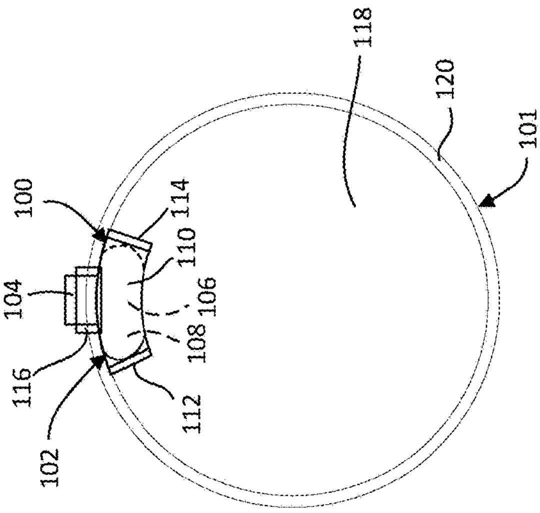
FIG. 11 is a schematic view of a percussion instrument with the muffler of FIG. 1 attached thereto, where the muffler is in the third folded position shown in FIG. 8.
Figure 12:
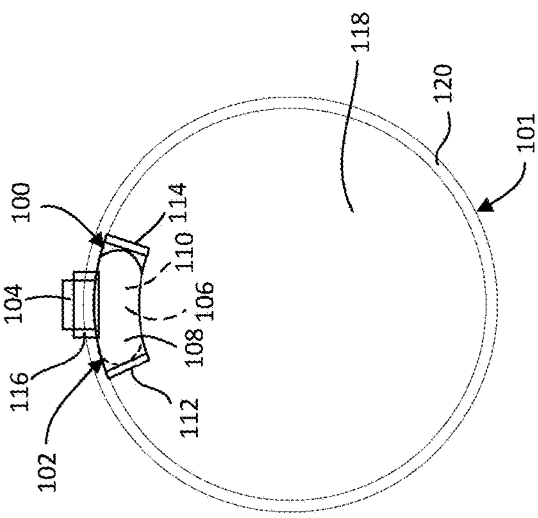
FIG. 12 is a schematic view of a percussion instrument with the muffler of FIG. 1 attached thereto, where the muffler is in a fourth folded position.

For example, referring to FIG. 5, the main body 102 of the muffler 100 is in a normal position when the hinge portions 112, 114 are in a normal or unfolded position and the side portions 108, 110 are substantially aligned with the middle portion 106. Referring to FIGS. 6 and 9, the main body 102 is moved from the normal position (as shown in FIGS. 1 and 5) to a first folded position by causing the hinge portion 112 to be bend such that the first side portion 108 is folded over the middle portion 106. Referring to FIGS. 7 and 10, the main body 102 is moved from the normal position (as shown in FIGS. 1 and 5) to a second folded position by causing the hinge portion 114 to be bend such that the second side portion 110 is folded over the middle portion 106. Referring to FIGS. 8 and 11, the main body 102 is moved from the first folded position (as shown in FIGS. 6 and 9) to a third folded position by causing the second hinge portion 114 to bend such that the second side portion 110 is folded over both the middle portion 106 and the first side portion 108. Similarly, referring to FIG. 12, the main body 102 can be moved from the second folded position (as shown in FIGS. 7 and 10) to a fourth folded position (not shown) by causing the first hinge portion 112 to bend such that the first side portion 108 is folded over both the middle portion 106 and the second side portion 110. While FIGS. 9-12 show the muffler 100 attached to a hoop 120 of a percussion instrument 101 with the main body 102 in various folded positions and against the hoop 120, it should be understood that the muffler 100 can be adjusted such that the main body is any suitable distance away from the hoop 120 (e.g., as shown in FIG. 3) while main body maintains or is moved between any of these folded positions.

The hinge portions 112, 114 can take any suitable form that allows the various portions 106, 108, 110 to be folded relative to each other. For example, the hinge portions 112, 114 can include a crease or groove, one or more openings, a plurality of perforations, one or more scores, a mechanical hinge component that is attached to the main body 102, a linkage material (e.g., a cord or thread), or any other form described in the present application, or any other suitable feature that allows for folding of main body 102 of the muffler 100 such that the muffler maintains the folded position during use of the percussion instrument.

Referring to FIG. 1, the main body 102 of the muffler 100 can have a width W of between about 32 mm and about 40 mm. In the illustrated embodiment, the middle portion 106 and the side portions 108, 110 of the muffler 100 have a uniform width W. In some embodiments, the middle portion 106 can have a different width W as compared to the side portions 108, 110. In certain embodiments, any of the portions 106, 108, 110 can have a different width W as compared to the other portions. Referring to FIG. 5, when in the normal position, the muffler 100 can have a length L1 of between about 165 mm and about 175 mm. Referring to FIG. 6, when in the first folded position, the muffler 100 can have a length L2 of between about 120 mm and about 125 mm. Referring to FIG. 7, when in the second folded position, the muffler 100 can have a length L3 of between about 120 mm and about 125 mm. In certain embodiments, the length L2 is equal to the length L3. In other embodiments, the length L2 and the length L3 are different. Referring to FIG. 8, when in the fully folded position, the muffler 100 can have a length L4 of between about 60 mm and about 65 mm.

The main body 102 of the muffler can be configured to engage between about 5% and about 85% of a surface of the drumhead 118 when the muffler 100 is attached to the percussion instrument 101. In some instances, the combination of the main body 102 and the tail portion 104 are sized to engage between about 5% and about 85% of the surface of the drumhead 118 when the muffler 100 is attached to the percussion instrument 101. Movement of the muffler 100 between its various positions allows a user to adjust the amount of engagement between the muffler 100 and the drumhead 118.

While the muffler 100 is shown as having a rounded shape the corresponds to the hoop 120 of the percussion instrument, it should be understood that the muffler 100 can have any suitable shape, such as a rectangular shape, a circular shape, an oval shape, or any other suitable shape that is capable of engaging the drumhead of a percussion instrument. While the first and second side portions 108, 110 are shown as having rounded side edges, it should be understood that the side edges can take any other suitable form, such as a straight edge, a pointed edge, or any other suitable shape.

While the muffler 100 is shown as having two hinge portions 112, 114, it should be understood that the muffler 100 can have any suitable number of hinge portions. For example, the muffler 100 can have a single hinge portion such that the muffler has two body portions with the single hinge portion therebetween, where the two body portions are capable of being folded over each other due to bending of the single hinge portions. Alternatively, the muffler 100 can have three or more hinge portions and a plurality of body portions, where the body portions can be folded relative to other body portions by bending the hinge portions.

Figure 13:
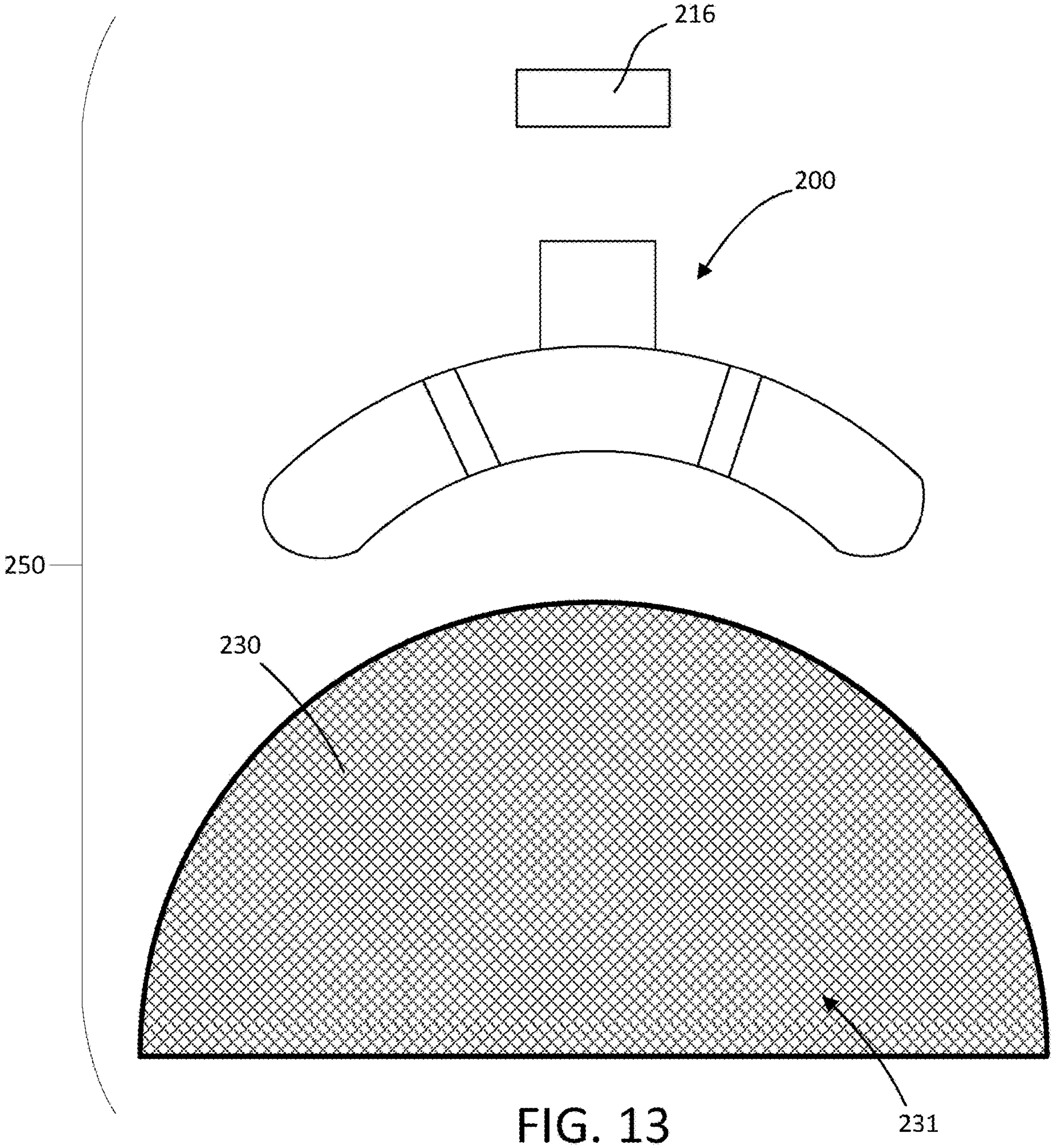
FIG. 13 is an exploded schematic view of an exemplary embodiment of a muffler system.
Figure 14:
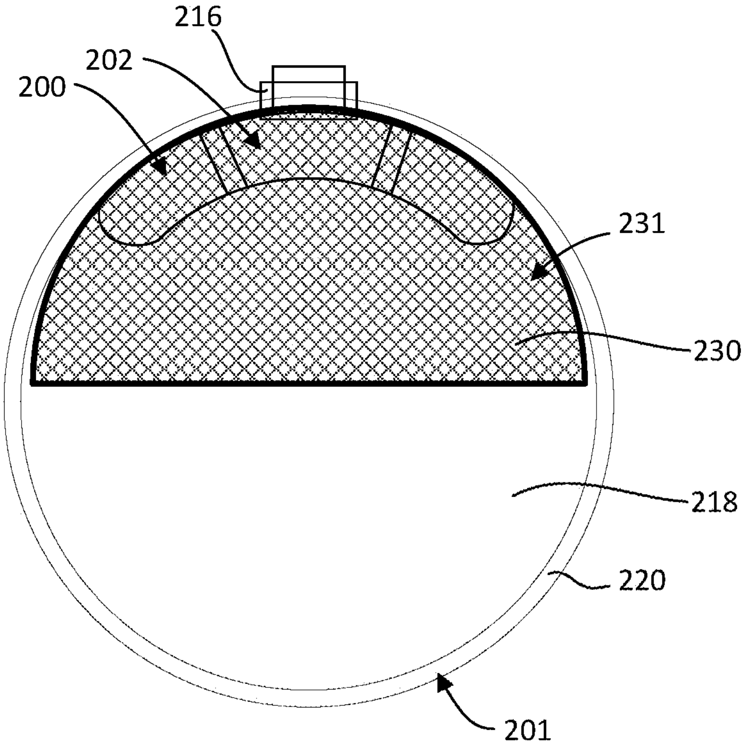
FIG. 14 is a schematic view of a percussion instrument with the muffler system of FIG. 13 attached thereto, where a muffler of the muffler system is in a first position relative to the percussion instrument.
Figure 15:
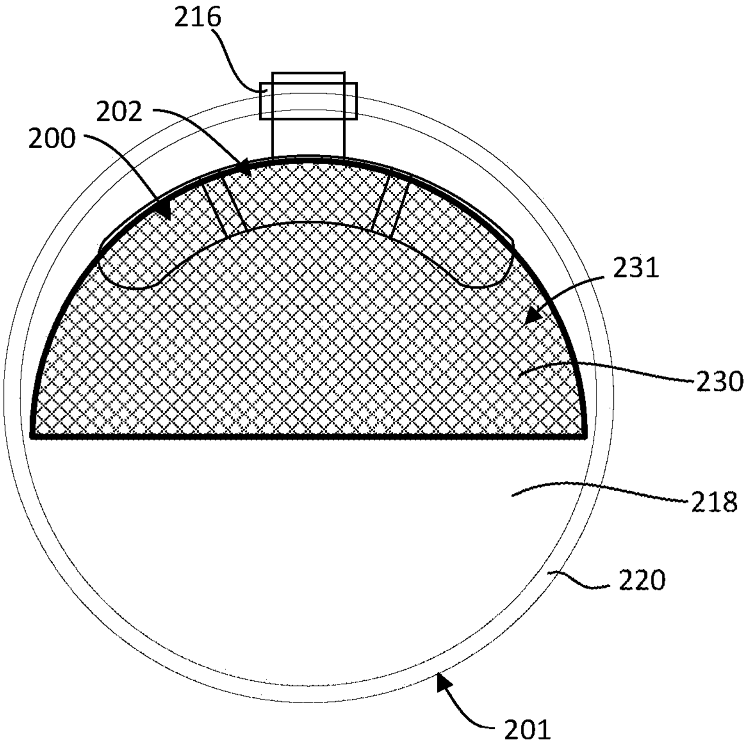
FIG. 15 is a schematic view of a percussion instrument with the muffler system of FIG. 13 attached thereto, where a muffler of the muffler system is in a second position relative to the percussion instrument.

FIG. 13-15 illustrate an exemplary embodiment of a drum muffler system 250 that includes a muffler 200, an optional connector 216 for connecting the muffler 200 to a percussion instrument 201 (FIGS. 14-15), and a mesh member 230. The muffler 200 can take any suitable form, such as, for example the form of any muffler described in the present application. The connector 216 can take any suitable form, such as, for example, the form of any connector described in the present application. In embodiments that do not include the connector 216, the muffler 200 can be attached to the percussion instrument 201 by any other suitable means. The percussion instrument 201 can be any suitable percussion instrument, such as, for example, any percussion instrument described in the present application.

The mesh member 230 is configured to attach to the muffler 200 and be in engagement with a drumhead 218 of the percussion instrument 201. Referring to FIGS. 14-15, the mesh member 230 can be attached to the muffler 200 when the muffler 200 is in various positions. For example, in embodiments in which the muffler 200 is adjustable (e.g., as described for muffler 100 with reference to FIGS. 2 and 3 of the present application), the mesh member 230 can be attached to the muffler 200 when the muffler 200 is in a normal position (as shown in FIG. 14) or an extended position (as shown in FIG. 15). The mesh member 230 can attach to the muffler 200 by any suitable means, such as, for example, an adhesive, stitching, or by any other suitable means. In the illustrated embodiment, the mesh member 230 is attached to the muffler 200 such that the proximal edges of the mesh member 230 and a main body 202 of the muffler 200 are substantially aligned. However, it should be understood that the mesh member 230 can be attached to the muffler 200 such that the main body 202 of the muffler 200 is any suitable position relative to the mesh member 230.

The mesh member 230 can configured to allow the drumhead 218 to breath and ring a slight amount without lowering the pitch of the percussion instrument. The mesh member 230 can include a plurality of sonic ventilation openings 231, where different forms for the plurality of sonic ventilation openings 231 can provide differing effects on the sound coming from the percussion instrument 201. The openings 231 can take a variety of different forms, such as any form of ventilation openings described in the present application. In some examples, the openings 231 can include one or more patterns of circular shapes, ovular shapes, triangular shapes, square shapes, any other suitable shape, and any combination thereof. The plurality of openings 231 can include patterns extending in a horizontal direction, a vertical direction, any angular direction relative to the horizontal and vertical directions; or the plurality of openings 231 can include two or more patters that extend in one or more of the horizontal, vertical, and angular directions. In the illustrated embodiment, the mesh member 230 has a shape the corresponds to the shape of a hoop 220 of the percussion instrument 201, but it should be understood that the mesh member 230 can take any suitable shape that is capable of engaging the drumhead 218, such as, for example, any shape for a mesh member described in the present application. The mesh member 230 can be made of, for example, polyester, rayon, spandex, lycra, a linen blend, any combination thereof, or any other suitable synthetic materials or natural materials.

FIGS. 16-21 illustrate another exemplary embodiment of a muffler 300 for a percussion instrument 301, where the muffler 300 includes a main body 302 and a tail portion 304 (FIGS. 18-19) connected to and extending from the main body 302. The tail portion 304 can be configured to be engaged by a connector 316 to connect the muffler 300 to the percussion instrument 301 such that the main body 302 engages an exterior of a drumhead 318 of the percussion instrument 301. In some instances, the tail portion 304 also engages an exterior of the drumhead 318. In the illustrated embodiment, the connector 316 is a clip that is configured to engage the hoop 320 of the percussion instrument 301 to secure the muffler 300 to the percussion instrument 301. For example, the connector 316 can take the form of the connector 116 shown in FIG. 4 of the present application. The connector 316, however, can take any other suitable form, such as, for example, any form described in the present application. The percussion instrument 301 can be, for example, a snare drum, field drum, bass drum, tom drum, drum set, timpani drum, or any other suitable percussion instrument.

Figure 17:
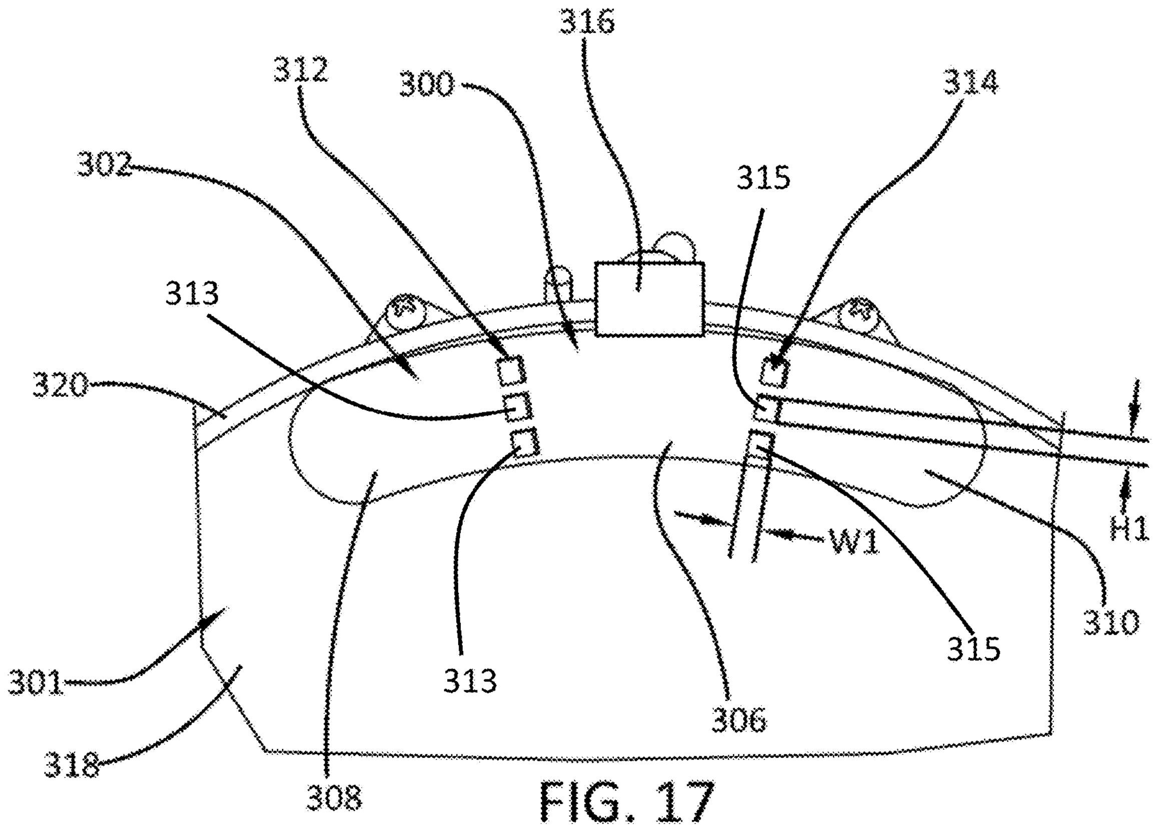
FIG. 17 is a top perspective view of the muffler of FIG. 16 in a first position relative to the percussion instrument.
Figure 18:
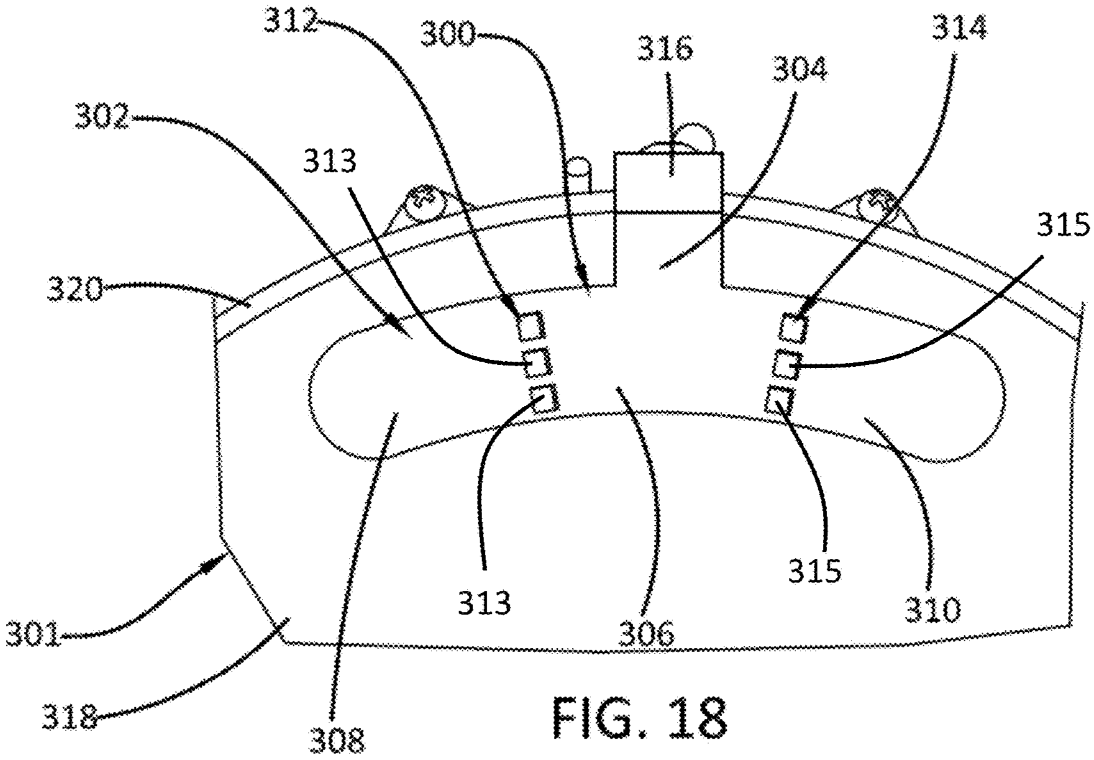
FIG. 18 is a top perspective view of the muffler of FIG. 16 in a second position relative to the percussion instrument.
Figure 19:
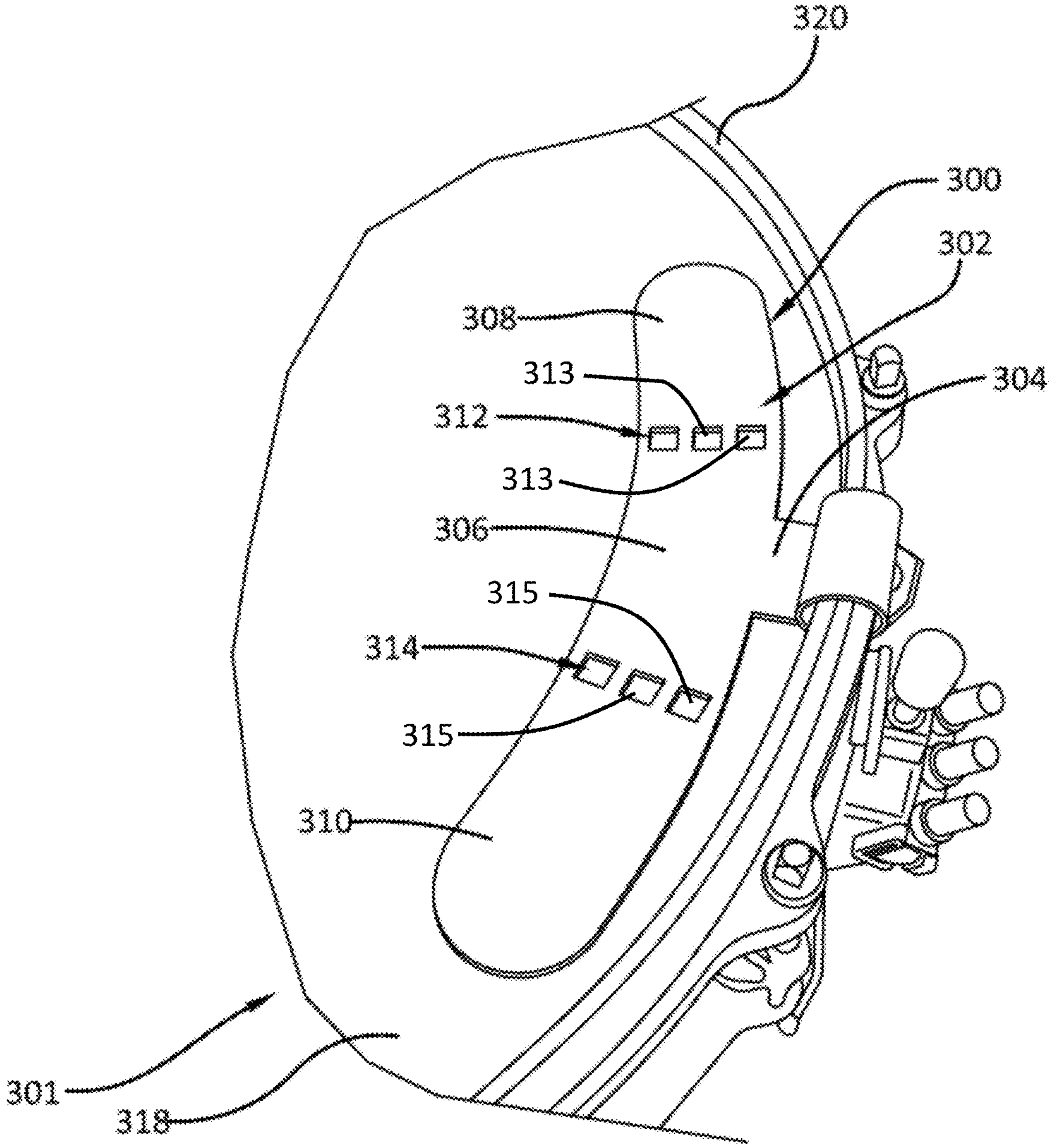
FIG. 19 is a side perspective view of the muffler of FIG. 16 attached to a percussion element by the connection element.

Referring to FIGS. 17 and 18, the tail portion 304 can be configured to be adjustably connected to the connector 316 such that the position of the muffler 300 relative to the hoop 320 of the percussion instrument 301 is adjustable. The tail portion 304 can extend a length from the main body 302 of between 5 mm about and about 20 mm. The tail can have a width of between about 15 mm and about 25 mm. In the illustrated embodiment, the tail portion 104 is shown extending from the middle portion 306 of the main body 302, but it should be understood that the tail portion 304 can extend from any portion of the main body 302.

The adjustability of the tail portion 304 allows the main body 302 of the muffler 300 to be positioned at various positions relative to the hoop 320 and, consequently, the drum shell (not shown) of the percussion instrument 301. The muffler 300 will provide less dampening to the percussion instrument 301 when the main body 302 is proximate the hoop 320 (as shown in FIG. 17), and the muffler 301 will provide more dampening to the percussion instrument 301 as the main body 302 is moved away from the hoop 320 (as shown in FIG. 18). When the muffler 300 is in an extended position such that the main body 302 is a distance away from the hoop 320, the tail portion 304 may also engage the drumhead 318 to provide dampening to the percussion instrument 301.

Referring again to FIGS. 16-21, the main body 302 can include a middle portion 306, a first side portion 308, and a second side portion 310. The main body 302 can further include a first hinge portion 312 and a second hinge portion 314, where the first hinge portion 312 is positioned between the middle portion 306 and the first side portion 308, and where the second hinge portion 314 is positioned between the middle portion 306 and the second side portion 310. The main body 302 and/or the tail portion 302 can be made of, for example, leather, synthetic leather, suede, synthetic suede, wool felt, canvas or natural cloth materials (woven, pressed, etc.), or any other suitable material, and any combination thereof. In certain embodiments, the main body 302 and the tail portion 304 are made from a single piece of material.

The first hinge portion 312 allows the first side portion 308 to be folded over the middle portion 306, and the second hinge portion 314 allows the second side portion 310 to be folded over the middle portion 306. This is advantageous because it allows the muffler 300 to be easily adjusted to provide a desired amount of dampening to the percussion instrument 301. That is, the muffler can be adjusted between an original position in which the side portions 308, 310 maintain a normal position relative to the middle portion 306, a partially folded position in which only one of the side portions 308, 310 is folded over the middle portion 306, and a fully folded position in which both side portions 308, 310 are folded over the middle portion.

Figure 20:
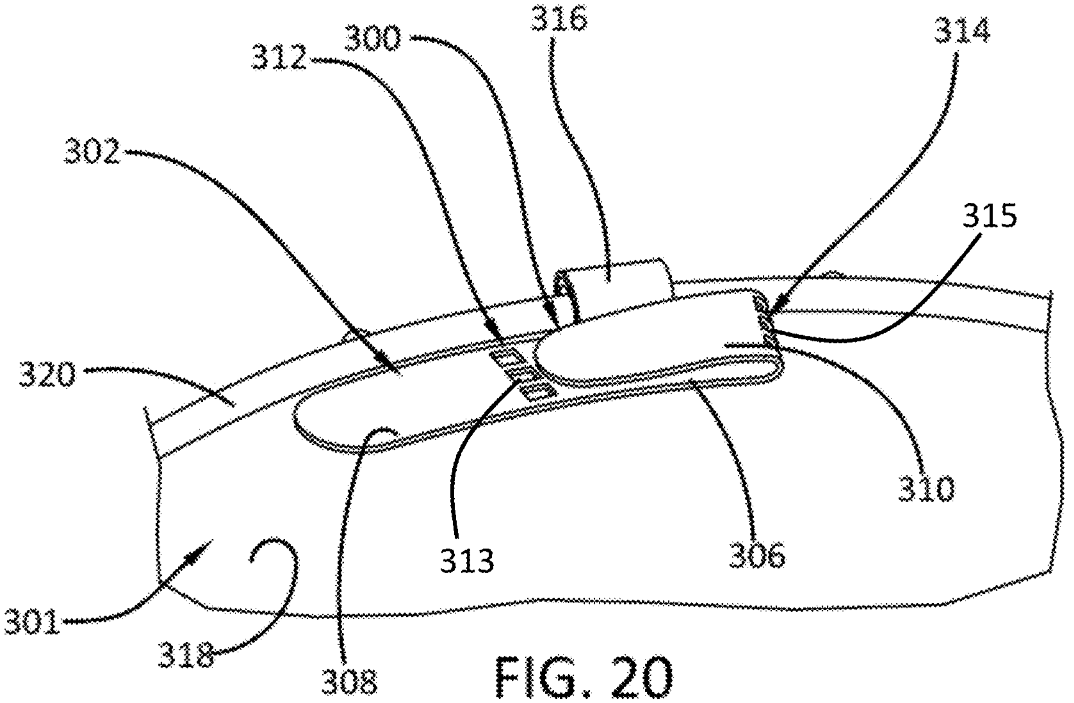
FIG. 20 is a front perspective view of the muffler of FIG. 16, where the muffler is in a first folded position.
Figure 21:
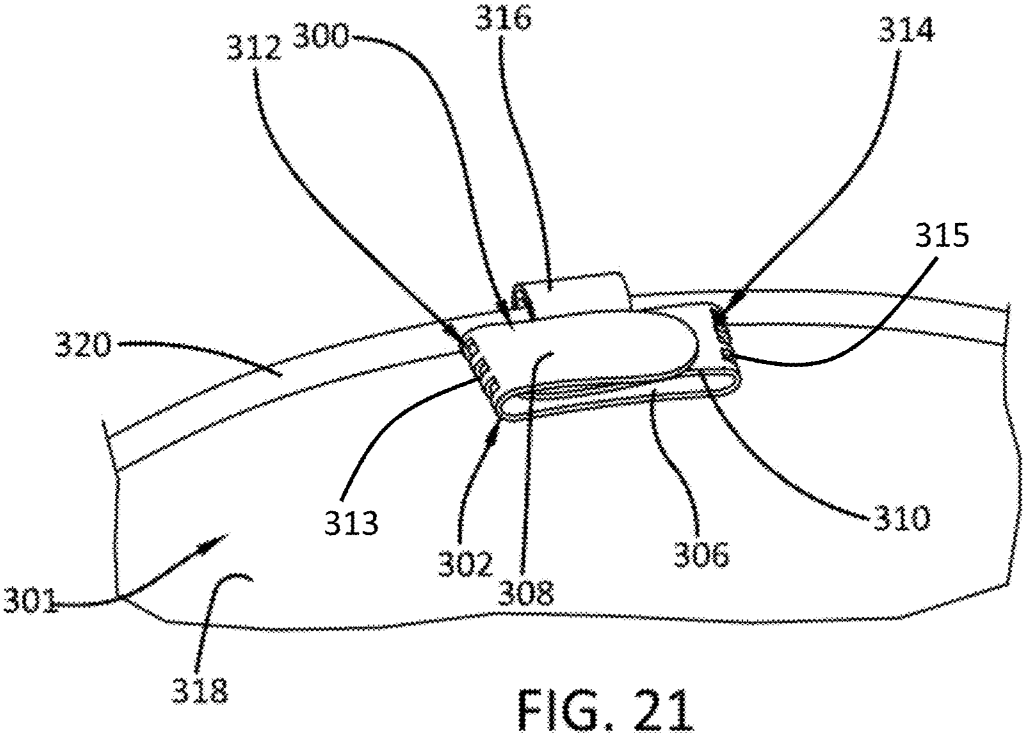
FIG. 21 is a front perspective view of the muffler of FIG. 16, where the muffler is in a second folded position.

For example, referring to FIGS. 16-19, the main body 302 of the muffler 300 is in a normal position when the hinge portions 312, 314 are in a normal or unfolded position and the side portions 308, 310 are substantially aligned with the middle portion 306. Referring to FIG. 20, the main body 302 is moved from the normal position (as shown in FIGS. 16-19) to a folded position by causing the second hinge portion 314 to bend such that the second side portion 310 is folded over the middle portion 306. Similarly, the main body 302 can be moved from the normal position to another folded position (not shown) by causing the first hinge portion 312 to bend such that the first side portion 308 is folded over the middle portion 106, while the second side portion maintains its normal position shown in FIGS. 16-19. Referring to FIG. 21, the main body 302 is moved from the folded position shown in FIG. 20 to another folded position by causing the first hinge portion 312 to bend such that the first side portion 308 is folded over both the middle portion 306 and the second side portion 310. Similarly, the main body 102 can be moved from the folded position described above with the first side member 308 being folded over the middle portion 306 and the second side member 310 being in its normal position to another folded position (not shown) by causing the second hinge portion 314 to bend such that the second side portion 310 is folded over both the middle portion 306 and the first side portion 308. It should be understood that the muffler 300 can be adjusted such that the main body 302 is any suitable distance away from the hoop 320 (e.g., as shown in FIGS. 17 and 18) while the main body 302 maintains or is moved between any of the folded positions described above.

In the illustrated embodiment, the first hinge portion 312 includes openings 313 and the second hinge portion 314 includes openings 315. The openings 313, 315 can take any suitable shape, such as, for example, a rectangular shape, a square shape, a circular shape, an oval shape, any other type of polygonal shape, or any other suitable shape. In the illustrated embodiment, each hinge portion 312, 314 includes three openings. Each hinge portion 312, 314 can, however, include any suitable number of openings that allow the corresponding side portions 308, 310 to be folded over the middle portion 306, such as, for example, one opening, two openings, three openings, four openings, five openings, six openings, or more than six openings. The hinge portions 312, 314 can, however, take any other suitable form that allows the various portions 306, 308, 310 to be folded relative to each other, such as, for example, any other form described in the present application. The hinge portions 312, 314 can take the same form or different forms.

Referring to FIG. 17, each of the openings 313, 315 can have a width W1 of between about 5 mm and about 7 mm. The openings 313, 315 can have a height H1 of between about 5 mm and about 7 mm. In various embodiments, a distance Z between adjacent openings is between about 3 mm and about 4 mm.

Figure 16:
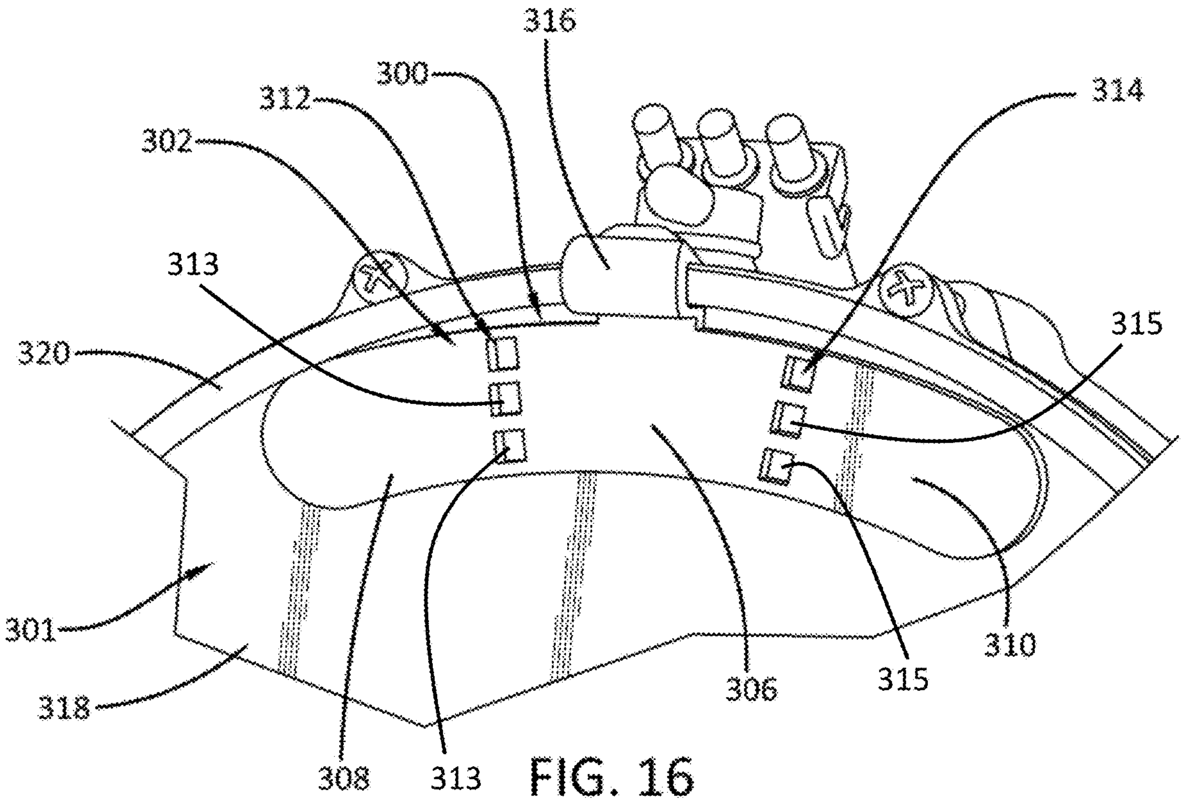
FIG. 16 is a top perspective view of another exemplary embodiment of a muffler for a percussion instrument attached to the percussion instrument by an exemplary embodiment of a connection element.

Referring to FIG. 16, the main body 302 of the muffler 300 can have a width (e.g., similar to the width W shown for the muffler 100 in FIG. 1) of between about 32 mm and about 35 mm. In the illustrated embodiment, the middle portion 306 and the side portions 308, 310 of the muffler 300 have a uniform width W. In some embodiments, the middle portion 306 can have a different width compared to the side portions 308, 310. In certain embodiments, any of the portions 306, 308, 310 can have a different width as compared to the other portions. Referring to FIG. 16-19, when in the normal position, the muffler 300 can have a length (e.g., similar to the length L1 for the muffler 100 shown in FIG. 5) of between about 165 mm and about 175 mm. Referring to FIG. 20, when in a folded position in which one of the side portions 308, 310 is folded over the middle portion 306 and the other side portion 308, 310 is in its normal position, the muffler 300 can have a length (e.g., similar to the length L2 and/or the length L3 for the muffler 100 shown in FIGS. 6 and 7) of between about 120 mm and about 125 mm. Referring to FIG. 21, when in the fully folded position, the muffler 300 can have a length (e.g., similar to the length L4 for the muffler 100 shown in FIG. 8) of between about 120 mm and about 125 mm. A ratio of the length of the main body 302 when in the normal position (as shown in FIGS. 16-19) to the length of the main body 302 when in the fully folded position (as shown in FIG. 21) can be between about 60 mm and about 65 mm.

The main body 302 of the muffler can be configured to engage between about 5% and about 85% of a surface of the drumhead 318 when the muffler 300 is attached to the percussion instrument 301. In some instances, the combination of the main body 302 and the tail portion 304 are sized to engage between about 5% and about 85% of the surface of the drumhead 318 when the muffler 300 is attached to the percussion instrument 301. Movement of the muffler 300 between its various positions allows a user to adjust the amount of engagement between the muffler 300 and the drumhead 318.

While the muffler 300 is shown as having a rounded shape the corresponds to the hoop 320 of the percussion instrument, it should be understood that the muffler 300 can have any suitable shape, such as a rectangular shape, a circular shape, an oval shape, or any other suitable shape that is capable of engaging the drumhead of a percussion instrument. While the first and second side portions 308, 310 are shown as having rounded side edges, it should be understood that the side edges can take any other suitable form, such as a straight edge, a pointed edge, or any other suitable shape.

While the muffler 100 is shown as having two hinge portions 312, 314, it should be understood that the muffler 300 can have any suitable number of hinge portions. For example, the muffler 300 can have a single hinge portion such that the muffler has two body portions with the single hinge portion therebetween, where the two body portions are capable of being folded over each other due to bending of the single hinge portions. Alternatively, the muffler 300 can have three or more hinge portions and a plurality of body portions, where the body portions can be folded relative to other body portions by bending the hinge portions.

Figure 22:
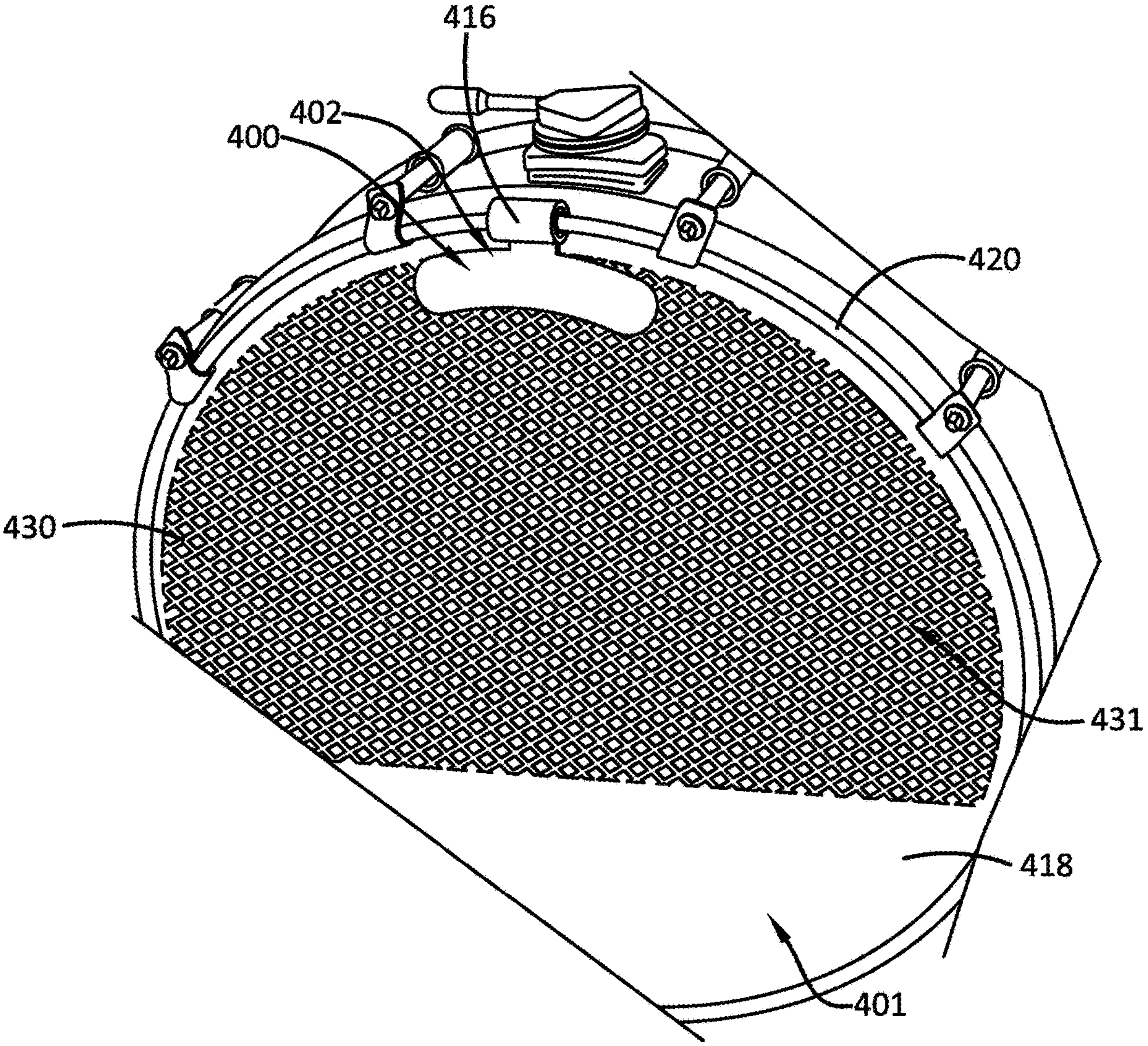
FIG. 22 is a top perspective view of another exemplary embodiment of a muffler system.

FIG. 22 illustrates an exemplary embodiment of a drum muffler system 450 that includes a muffler 400, an optional connector 416 for connecting the muffler 400 to a percussion instrument 201 (FIGS. 14-15), and a mesh member 430. The muffler 400 can take any suitable form, such as, for example the form of any muffler described in the present application. In the illustrated embodiment, the main body 402 of the muffler does not include any hinge portions. In these embodiments, the muffler 400 can take the form of any muffler described in the present application that but without the hinge portions. In other embodiments, the muffler 400 can include one or more hinge portions that allow the muffler 400 to be folded as desired. The connector 416 can take any suitable form, such as, for example, the form of the connector 116 described with reference to FIG. 4 or any other form for a connector described in the present application. In embodiments that do not include the connector 416, the muffler 400 can be attached to the percussion instrument 401 by any other suitable means. In the illustrated embodiment, the percussion instrument 401 is a snare drum, but it should be understood that the muffler system 400 can be used with any suitable percussion instrument, such as, for example, any percussion instrument described in the present application.

The mesh member 430 is configured to attach to the muffler 400 and be in engagement with a drumhead 418 of the percussion instrument 401. The mesh member 230 can be attached to the muffler 400 when the muffler 200 is in various positions. For example, in embodiments in which the position of the muffler 400 relative to the percussion instrument 401 is adjustable, the mesh member 430 can be attached to the muffler 400 when the muffler 400 is in a normal position or an extended position. The mesh member 430 can attach to the muffler 400 by any suitable means, such as, for example, an adhesive, stitching, or by any other suitable means. In the illustrated embodiment, the mesh member 430 is attached to the muffler 400 such that the proximal edges of the mesh member 430 and a main body 402 of the muffler 400 are substantially aligned. However, it should be understood that the mesh member 430 can be attached to the muffler 400 such that the main body 402 of the muffler 400 is any suitable position relative to the mesh member 430. The mesh member 430 can configured to allow the drumhead 418 to breath and ring a slight amount without lowering the pitch of the percussion instrument.

Figure 24:
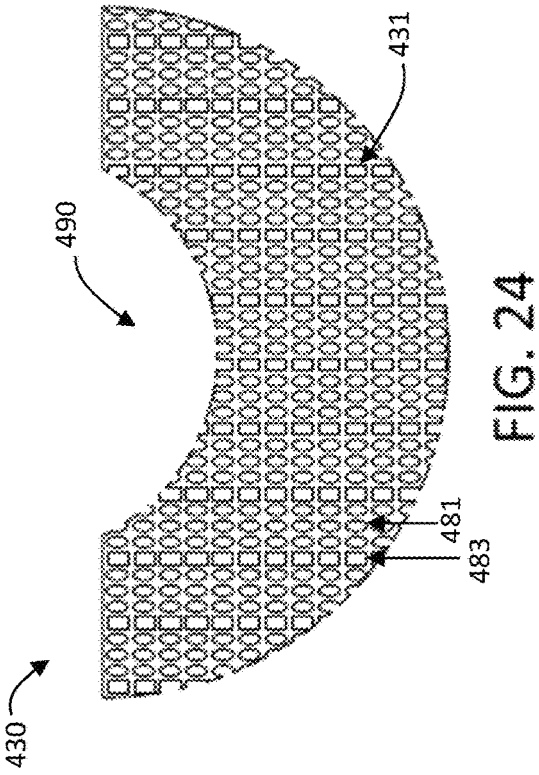
FIG. 24 illustrates another exemplary embodiment of a mesh member for the muffler system of FIG. 22.
Figure 26:
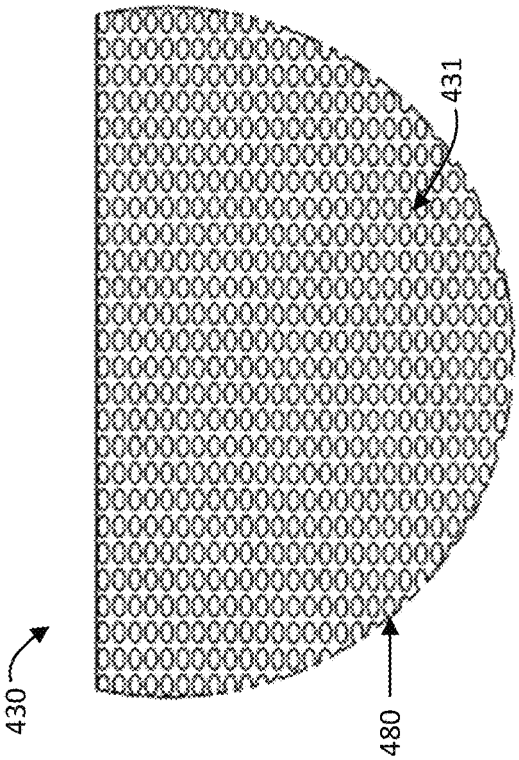
FIG. 26 illustrates another exemplary embodiment of a mesh member for the muffler system of FIG. 22.

The mesh member 430 can include a plurality of sonic ventilation openings 431, where different forms for the plurality of sonic ventilation openings 431 can provide differing effects on the sound coming from the percussion instrument 401. In the illustrated embodiment, the plurality of ventilation openings includes a plurality of rows of ovular openings (similar to the rows of ovular openings 485 shown in FIG. 26). The openings 231 can take a variety of different forms, such as any form of ventilation openings described in the present application. For example, referring to FIGS. 23 and 25, the mesh member 430 can include a plurality of horizontal rows 480 of ovular openings with a horizontal row 482 of rectangular openings disposed between the plurality of rows 480 of ovular openings. Referring to FIG. 24, the mesh member 430 alternatively can include a plurality of vertical rows 481 of ovular openings with a vertical row 483 of rectangular openings disposed between the plurality of rows 480 of ovular openings. Referring to FIG. 26, the mesh member 430 can include a plurality of horizontal rows 480 of ovular openings. It should be understood, however, that the plurality of openings 431 can include one or more patterns of circular shapes, ovular shapes, triangular shapes, square shapes, any other suitable shape, and any combination thereof. The plurality of openings 431 can include patterns extending in a horizontal direction, a vertical direction, any angular direction relative to the horizontal and vertical directions; or the plurality of openings 231 can include two or more patters that extend in one or more of the horizontal, vertical, and angular directions.

Figure 23:
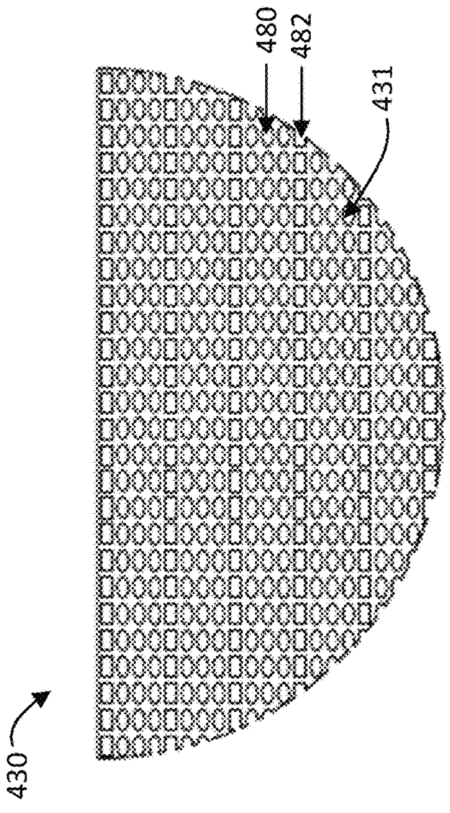
FIG. 23 illustrates an exemplary embodiment of a mesh member for muffler system of FIG. 22.
Figure 25:
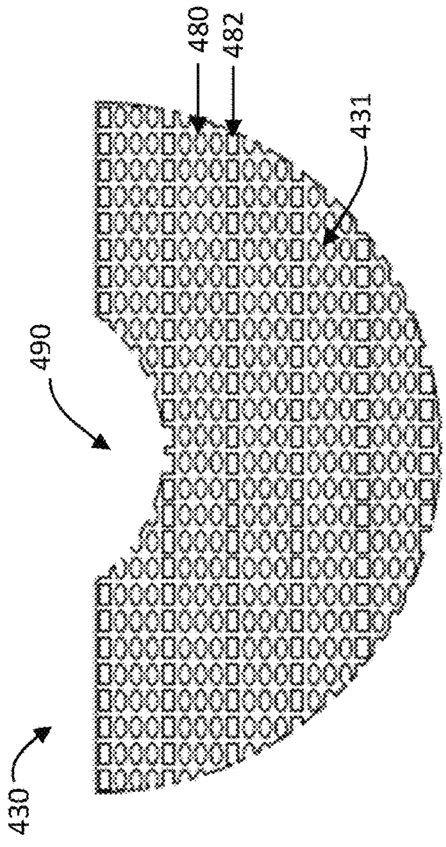
FIG. 25 illustrates another exemplary embodiment of a mesh member for the muffler system of FIG. 22.

The mesh member 430 can take any suitable shape, such as, for example, any shape described in the present application. Referring to FIG. 23, the mesh member 430 can take a semi-circular shape. Referring to FIGS. 24 and 25, the mesh member 430 can include a cutout 490. The cutout 490 can take any suitable shape and be any suitable size, where different shapes and/or sizes of the cutout 490 can provide differing effects on the sound coming from the percussion instrument 401. In the illustrated examples, the cutout 490 shown in FIG. 24 is larger than the cutout 490 shown in FIG. 25. Referring to FIG. 26, the mesh member 430 can have a partial-circular shape that is larger than a semi-circular shape such that the mesh member extends over more than half of the drumhead 418 (FIG. 22) of the percussion instrument 401 (FIG. 22). In other examples, the mesh member 430 can have a partial-circular shape that is smaller than a semi-circular shape. In various examples, the mesh member 430 can have a shape the corresponds to the shape of a hoop 420 of the percussion instrument 401, or the mesh member 430 can take any other suitable shape that is capable of engaging the drumhead 418. The mesh member 430 can be made of, for example, polyester, rayon, spandex, lycra, a linen blend, any combination thereof, or any other suitable synthetic materials or natural materials.

FIG. 23 depicts an exemplary methodology for forming hinge portions on a muffler for a percussion instrument. While the methodology is shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Figure 27:
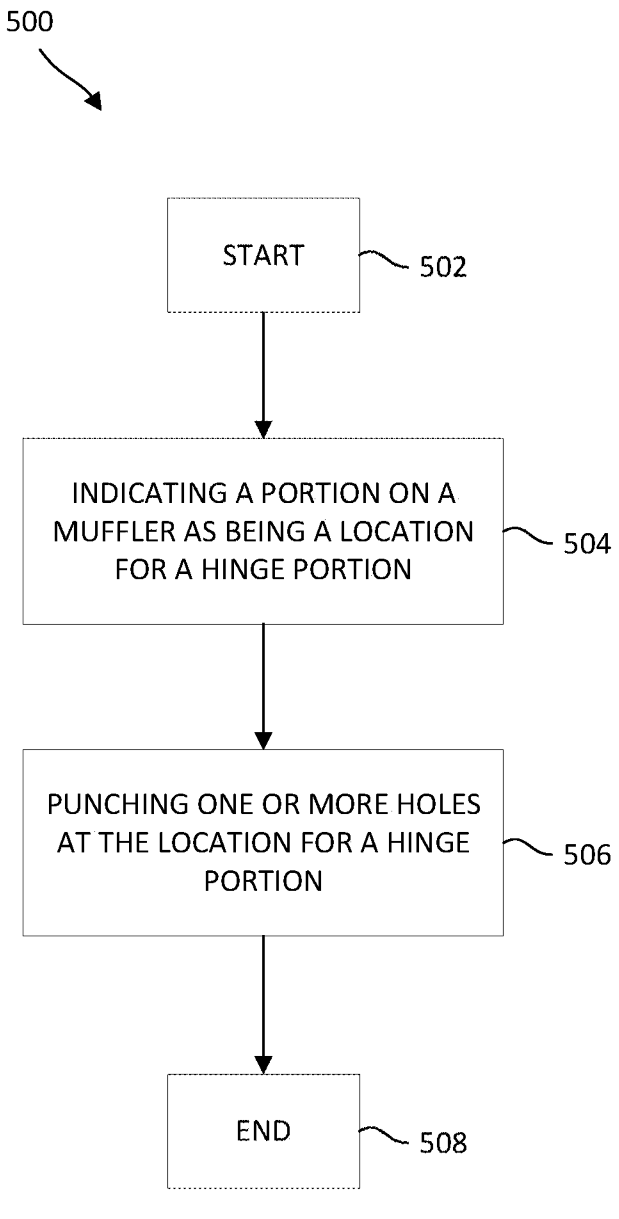
FIG. 27 is a flow chart illustrating an exemplary method for forming one or more hinge portions on a muffler for a percussion instrument.

Referring to FIG. 27, the methodology 500 begins at 502, and at 504 a portion on the muffler is indicated as being a location for a hinge portion. The muffler can include a piece of material made of, for example, leather, synthetic leather suede, synthetic suede, wool felt, other synthetic materials, or any other suitable material, and any combination thereof. The muffler can take any suitable shape, such as, for example, the shape of any muffler described in the present application. At 506, one or more holes are punched at the location for the hinge portion such that at least one of the portions of the muffler adjacent the one or more holes is capable of folding over the other of the portions adjacent to the one or more holes. The holes can take any suitable shape, such as, for example, any shape of the hinge portions 312, 314 described with reference to FIGS. 16-21. In addition, the holes can have any suitable dimensions, such as, for example, any dimensions of the hinge portions 312, 314 described with reference to FIGS. 16-21. The methodology concludes at 410.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A muffler for a percussion instrument, the muffler comprising:

a main body configured to engage a drumhead of the percussion instrument to dampen sound of the percussion instrument, the main body comprising a middle portion, a first side portion, a second side portion, a first hinge portion disposed between the first side portion and the middle portion, and a second hinge portion disposed between the second side portion and the middle portion;

wherein the first hinge portion allows the first side portion to be folded over the middle portion;

wherein the second hinge portion allows the second side portion to be folded over the middle portion; and wherein the first hinge portion comprises one or more openings.

2. The muffler according to claim 1, further comprising a tail portion that extends from the middle portion of the main body.

3. The muffler according to claim 2, wherein the tail portion has one or more connection openings for connecting to a connector that is configured to attach the muffler to the percussion instrument.

4. The muffler according to claim 3, wherein the tail portion has a plurality of connection openings that allow for the muffler to be connected to the connector at two or more positions relative to the connector-portion and the connection element to adjust a position of the main body relative to the percussion instrument.

5. The muffler according to claim 1, wherein the main body comprises leather.

6. The muffler according to claim 1, wherein the one or more openings comprise one or more rectangular shaped openings.

7. The muffler according to claim 6, wherein each of the one or more rectangular shaped openings have a width of between about 5 mm and about 7 mm.

8. The muffler according to claim 1, wherein the main body of the muffler has a width of between about 32 mm and about 40 mm.

9. The muffler according to claim 1, wherein the main body is movable from a normal position to one or more folded positions.

10. The muffler according to claim 9, wherein a first folded position includes the first side portion being folded over the middle portion without folding the second side portion over the middle portion.

11. The muffler according to claim 10, wherein a second folded position includes the second side portion being folded over both the first folded portion and the middle portion.

12. A muffler system for a percussion instrument, the muffler system comprising:

a muffler having a main body and a tail portion extending from the main body, the tail portion having one or more connection openings, the main body comprising:

a middle portion;

a first side portion;

a second side portion;

a first hinge portion disposed between the first side portion and the middle portion; and a second hinge portion disposed between the second side portion and the middle portion;

wherein the first hinge portion allows the first side portion to be folded over the middle portion; and wherein the second hinge portion allows the second side portion to be folded over the middle portion;

a mesh member configured to be attached to the muffler;

a clip configured to attach the muffler to the percussion instrument, wherein the clip has one or more connection openings for alignment with the one or more connection openings of the tail portion of the muffler such that a fastener can be inserted into a connection opening of the one or more connection openings of the clip and an aligned connection opening of the one or more connection openings of the tail portion of the muffler to secure the muffler to the clip.

13. The muffler system according to claim 12, wherein the positioning of the main body of the muffler relative to the clip is adjustable.

14. The muffler system according to claim 12, wherein the main body of the clip has a thickness between about 1 mm and about 2 mm.

15. The muffler system according to claim 12, wherein the mesh member is attached to the muffler by one of an adhesive and stitching.

16. The muffler system according to claim 12, wherein the mesh member comprises a plurality of sonic ventilation openings.

17. The muffler system according to claim 16, wherein the plurality of sonic ventilation openings comprises a plurality of horizontal rows of ovular-shaped openings.

18. A method of forming one or more hinge portions on a muffler for a percussion instrument, the method comprising:

indicating a location on the muffler for a hinge portion; and punching one or more holes at the location such that a first portion of the muffler is disposed on one side of the one or more holes and a second portion of the muffler is disposed on another side of the one or more holes, wherein the one or more holes allow the first portion of the muffler to be folded over the second portion of the muffler.

19. The method according to claim 18, further comprising:

indicating a second location on the muffler for a second hinge portion;

punching one or more second holes at the second location such that the second portion of the muffler is disposed on one side of the one or more second holes and a third portion of the muffler is disposed on another side of the one or more second holes, wherein the one or more second holes allow the third portion of the muffler to be folded over the second portion of the muffler.

* * * * *